United States Patent [19]

Sydansk

[11] Patent Number: 4,989,673

[45] Date of Patent: Feb. 5, 1991

[54] LOST CIRCULATION FLUID FOR OIL FIELD DRILLING OPERATIONS

[75] Inventor: Robert D. Sydansk, Littleton, Colo.

[73] Assignee: Marathon Oil Company, Findlay, Ohio

[21] Appl. No.: 380,565

[22] Filed: Jul. 14, 1989

[51] Int. Cl.$^5$ .................. C09K 7/02; E21B 21/06; E21B 21/08; E21B 33/138

[52] U.S. Cl. .................. 166/250; 166/294; 166/295; 175/48; 175/65; 175/72; 252/8.512; 252/8.514

[58] Field of Search .............. 166/294, 295, 250; 175/48, 72, 65; 252/8.512, 8.51, 8.511, 8.514; 523/130

[56] References Cited

U.S. PATENT DOCUMENTS

| | | | |
|---|---|---|---|
| Re. 32,114 | 4/1986 | Argabright et al. | 166/252 |
| 3,081,260 | 3/1963 | Park | 252/8.51 X |
| 3,208,524 | 9/1965 | Horner et al. | 175/72 X |
| 3,243,000 | 3/1966 | Patton et al. | 252/8.511 X |
| 3,265,631 | 8/1966 | Jordan | 252/8.512 X |
| 3,740,360 | 6/1973 | Nimerick | 175/65 X |
| 3,762,485 | 10/1973 | Chesser et al. | 175/65 |
| 3,818,998 | 6/1974 | Hessert | 175/72 |
| 3,909,421 | 9/1975 | Gaddis | 166/275 X |
| 3,921,733 | 11/1975 | Clampitt | 252/8.511 X |
| 4,043,921 | 8/1977 | Hessert et al. | 252/8.51 |
| 4,183,406 | 1/1980 | Lundberg et al. | 175/72 X |
| 4,282,928 | 8/1981 | McDonald et al. | 166/274 |
| 4,643,255 | 2/1987 | Sandiford et al. | 166/295 |
| 4,664,816 | 5/1987 | Walker | 175/72 X |
| 4,675,119 | 6/1987 | Farrar et al. | 252/8.514 |
| 4,683,949 | 8/1987 | Sydansk et al. | 166/270 |
| 4,688,639 | 8/1987 | Falk | 166/295 |
| 4,706,754 | 11/1987 | Smith | 166/295 |
| 4,722,397 | 2/1988 | Sydansk et al. | 166/295 |
| 4,723,605 | 2/1988 | Sydansk | 166/295 |
| 4,724,906 | 2/1988 | Sydansk | 166/295 |
| 4,726,906 | 2/1988 | Chen et al. | 252/8.514 |
| 4,730,674 | 3/1988 | Burdge et al. | 166/295 |
| 4,730,675 | 3/1988 | Wygant et al. | 166/295 |
| 4,740,319 | 4/1988 | Patel et al. | 252/8.515 |
| 4,744,418 | 5/1988 | Sydansk | 166/270 |
| 4,744,419 | 5/1988 | Sydansk et al. | 166/270 |
| 4,770,245 | 9/1988 | Sydansk | 166/295 |
| 4,779,680 | 10/1988 | Sydansk | 166/300 |
| 4,844,168 | 7/1989 | Sydansk | 166/270 |

OTHER PUBLICATIONS

Shuttleworth and Russel, *Journal of the Soc. of Leather Trades' Chemists*, "The Kinetics of Chrome Tannage, Part I.," United Kingdom, 1965, v. 49, pp. 133–154; Part III, United Kingdom, 1965, v. 49, pp. 251–260; Part IV, United Kingdom, 1965, v. 49, pp. 261–268.

Von Erdman, *Das Leder*, "Condensation of Mononuclear Chromium (III) Salts to Polynuclear Compounds," Eduard Roether Verlag, Darmstadt, Germany, 1963, v. 14, p. 249.

Udy, Marvin J., Chromium, vol. 1: *Chemistry of Chromium and its Compounds*, Reinhold Publishing Corp., N.Y., 1956, pp. 229–233.

Cotton and Wilkinson, *Advanced Inorganic Chemistry*, 3rd Ed., John Wiley and Sons, Inc., N.Y., 1972, pp. 836–839.

R. D. Sydansk, A New Conformance-Improvement--Treatment Chromium (III) Gel Technology, SPE/DOE 17329, presented at SPE/DOE Enhanced Oil Recovery Symposium, Tulsa, Oklahoma, Apr. 17–20, 1988.

R. D. Sydansk et al, Field Testing of a New Conformance-Improvement-Treatment Chromium (III) Gel Technology, SPE/DOE 17383, Presented at SPE/DOE Enhanced Oil Recovery Symposium, Tulsa, Oklahoma, Apr. 17–20, 1988.

*Primary Examiner*—George A. Suchfield
*Attorney, Agent, or Firm*—Jack L. Hummel; Jack E. Ebel

[57] ABSTRACT

A flowing crosslinked polymer gel is employed as a lost circulation fluid in a process for reducing lost circulation during an oil field drilling operation. The lost circulation fluid comprises a carboxylate-containing polymer, a chromic carboxylate crosslinking agent, and an aqueous solvent.

18 Claims, No Drawings

4,989,673

LOST CIRCULATION FLUID FOR OIL FIELD DRILLING OPERATIONS

BACKGROUND OF THE INVENTION

1. Technical Field

The invention relates to a process for drilling into a subterranean hydrocarbon-bearing formation and more particularly to a process for minimizing lost circulation of a drilling fluid when drilling into a subterranean hydrocarbon-bearing formation.

2. Background Information

A drilling fluid is a fluid which is circulated from an earthen surface down through a drilled out wellbore to a drilling face and back to the surface when drilling into a subterranean formation which contains hydrocarbons. Drilling fluids are specifically designed to perform a number of functions, including cooling and lubricating the drill bit, removing drill cuttings from the wellbore, supporting the weight of the drill pipe and drill bit, providing a hydrostatic head to maintain the integrity of the wellbore walls, preventing significant flow of fluids across the wellbore face into the wellbore and vice versa.

The most common conventional drilling fluids known in the art are termed "drilling muds", which are dispersions of solid particles in a liquid. Examples of drilling muds are aqueous dispersions of clays (e.g. bentonite) and/or gypsum. Drilling muds also commonly contain one or more polymeric additives in an effort to control "lost circulation", which is the excessive flow of drilling fluids across the wellbore face out of the wellbore and into the formation. See, for example, U.S. Pat. Nos. 4,740,319 to Patel et al, 4,726,906 to Chen et al, 4,675,119 to Farrar et al and 4,282,928 to McDonald et al. Solutions containing materials, such as polymeric additives, which inhibit the flow of drilling fluids from the wellbore into the formation, are termed "lost circulation fluids".

The drilling art reflects an on-going evolution to develop lost circulation fluids which effectively control lost circulation under a broad range of operating conditions. Many lost circulation fluids known in the art are unsatisfactory because of operational limitations restricting their utility. For example, some lost circulation fluids are ineffective in the presence of high salt concentration brines. Others undergo thermal degradation when subjected to high operational temperatures. The most significant shortcoming is the lack of lost circulation fluids in the art, which effectively control lost circulation encountered when drilling through voids occurring in the formation.

Thus, a need exists for a lost circulation fluid which effectively prevents or reduces lost circulation of drilling fluid under the broadest range of operating conditions encountered. Specifically, a need exists for a lost circulation fluid which not only minimizes lost circulation into competent formation rock, but which has sufficient strength and integrity to minimize lost circulation into voids in direct communication with the wellbore, such as fractures and fracture networks.

SUMMARY OF THE INVENTION

The present invention provides a process for preventing or reducing lost circulation when drilling by conventional methods into a subterranean hydrocarbon-bearing formation. The process employs a continuous, flowing, crosslinked, polymer gel, as a lost circulation fluid. Lost circulation is undesirable from an economic standpoint because it requires one to continually replenish the wellbore with costly drilling fluid. Lost circulation is also undesirable from an operational and safety standpoint because it can damage the pay zone and in extreme cases it can result in a blowout of the hydrocarbon zone followed by a well fire.

A gel is employed in the present invention according to several embodiments. In one embodiment the gel is placed in the wellbore at the outset of the drilling operation as a single wellbore fluid performing the dual role of a drilling fluid and a lost circulation fluid. Alternatively, the gel is placed in the wellbore as an additive of a conventional drilling fluid also present in the wellbore. The gel functions in the single role of a lost circulation fluid. Finally, the gel can function in a remedial role by placing it in the wellbore only after lost circulation has been detected.

The utility of the present process is attributable to the specific composition of the gel used as lost circulation fluid. The polymer gel composition comprises a carboxylate-containing polymer, a chromic carboxylate complex crosslinking agent and an aqueous solvent. The gel constituents are premixed at the surface and crosslinked to form a continuous flowing gel, which effectively inhibits the flow of drilling fluid into the formation when placed in a wellbore during a drilling operation. The gel is nondamaging to the formation and is reversible if any residual gel undesirably accumulates near the wellbore face.

The gel employed in the present invention has utility over a broad range of operating conditions. The gel is effective in the presence of high salt concentration brines and is resistant to thermal degradation at temperatures generally encountered during drilling operations. Furthermore, the gel can be formulated over a very broad range of onset times, rheologies, strengths, and viscosities. Nevertheless, the gel is relatively insensitive to minor variations in conditions under which it is formulated. Thus, the gel is readily suited for on-site preparation in the field where process controls are often imprecise, such as remote hostile onshore and offshore locations.

In addition to the above recited operational advantages, the gel employed in the present invention can offer practical advantages over lost circulation fluids known in the art. The present process is cost effective because the gel components are readily available and relatively inexpensive. The gel can be applied with conventional oil field equipment. Finally, the gel composition is relatively nontoxic in the environment and safe to handle.

Gels similar to those used in the process of the present invention have known utility in conformance improvement treatment (CIT) processes as shown in U.S. Pat. Nos. 4,683,949 and 4,744,499 to Sydansk et al, which are incorporated herein by reference. However, the performance requirements of lost circulation gels are different from those of CIT gels. The composition and resulting properties of the lost circulation fluid must be specific to the performance requirements of the drilling operation. The present invention fills a need in the art for a process, which utilizes a polymer gel composition to control lost circulation when drilling hydrocarbon-related wellbores under a broad range of conditions.

DESCRIPTION OF PREFERRED EMBODIMENTS

The present invention is a process to minimize lost circulation when conducting drilling operations in accordance with methods known to those skilled in the art. One initiates the process of the present invention either as a lost circulation preventative or as a remedy when lost circulation has already occurred. Lost circulation is indicated by the entry of drilling fluids into a newly drilled formation, a significantly reduced volume of drilling fluids returning to the surface, or an inability to maintain a column of drilling fluid in the wellbore.

The process is initiated by formulating a crosslinked polymer gel composition at the surface for placement in the wellbore being drilled. The term "crosslinked polymer gel" as used herein is directed to a continuous three-dimensional crosslinked polymeric network having a high molecular weight. The gel contains a liquid medium such as water which is contained within the solid polymeric network. The fusion of a liquid and a solid component into a single-phase system provides the gel with a unique phase behavior.

The gel composition used in the present process comprises a polymer, a crosslinking agent and an aqueous solvent. The polymer is a carboxylate-containing polymer which is a crosslinkable water-soluble polymer having one or more carboxylate groups or, alternatively, having one or more groups capable of being hydrolyzed to carboxylate groups (e.g., amide groups). The carboxylate-containing polymer satisfying these criteria may be either a synthetic polymer or a biopolymer. The average molecular weight of the polymer is in the range of about 10,000 to about 50,000,000, preferably about 100,000 to about 20,000,000 and most preferably about 200,000 to about 15,000,000.

The preferred polymer of the present invention is an acrylamide polymer, which is defined herein as a crosslinkable, water-soluble, synthetic polymer containing one or more acrylamide groups. Useful acrylamide polymers include polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in a carboxylate form. Partially hydrolyzed polyacrylamide (PHPA) is an acrylamide polymer having at least 1%, but not 100%, of the acrylamide groups in a carboxylate form. The acrylamide polymer may be prepared according to any conventional method known in the art, but preferably has the specific properties of an acrylamide polymer prepared according to the method disclosed by U.S. Pat. No. Re. 32,114 to Argabright et al incorporated herein by reference.

The crosslinking agent of the present invention is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

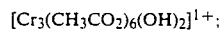

[Cr$_3$(CH$_3$CO$_2$)$_6$(OH)$_2$]$^{1+}$;

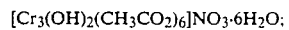

[Cr$_3$(OH)$_2$(CH$_3$CO$_2$)$_6$]NO$_3$·6H$_2$O;

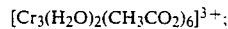

[Cr$_3$(H$_2$O)$_2$(CH$_3$CO$_2$)$_6$]$^{3+}$;

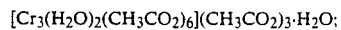

[Cr$_3$(H$_2$O)$_2$(CH$_3$CO$_2$)$_6$](CH$_3$CO$_2$)$_3$·H$_2$O;

etc.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are especially preferred. The carboxylate species include the following water-soluble species: formate, acetate, propionate, lactate, substituted derivatives thereof, and mixtures thereof. Examples of optional inorganic ions include sodium, sulfate, nitrate and chloride ions.

A host of complexes of the type described above and their method of preparation are well known in the leather tanning art. These complexes are described in Shuttleworth and Russel, *Journal of the Society of Leather Trades' Chemists*, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, *Das Leder*, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., *Chromium, Volume 1: Chemistry of Chromium and its Compounds*, Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent cation, e.g., CrCl$_3$, may also be combined with the crosslinking agent complex to accelerate gelation of the polymer solution, as described in U.S. Pat. No. 4,723,605, which is incorporated herein by reference.

The gel is formed by admixing the polymer, the crosslinking agent and aqueous solvent at the surface. Surface admixing broadly encompasses inter alia mixing the gel components in bulk at the surface prior to injection or simultaneously mixing the components at or near the wellhead by in-line mixing means while injecting them.

Admixing is accomplished, for example, by dissolving the starting materials for the crosslinking agent in an appropriate aqueous solvent. Exemplary starting materials include solid $CrAc_3 \cdot H_2O$, solid $Cr_3Ac_7 \cdot (OH)_2$, or a solution labeled "Chromic Acetate 50% Solution" commercially available, for example, from McGean-Rohco Chemical Co., Inc., 1250 Terminal Tower, Cleveland, Ohio 44113, U.S.A. The crosslinking agent solution is then mixed with an aqueous polymer solution to produce the gel. Among other alternatives, the starting materials for the crosslinking agent can be dissolved directly in the aqueous polymer solution to form the gel in a single step.

The present process enables the practitioner to customize or tailor-make a gel having a predetermined gelation rate and predetermined gel properties of strength and thermal stability from the above-described composition. The gelation rate is defined as the degree of gel formation as a function of time or, synonymously, the rate of crosslinking in the gel. The degree of crosslinking may be quantified in terms of several variables including gel viscosity, strength and plugging efficiency. Plugging efficiency is defined as the normalized reduction in flow rate through a narrow constriction or porous media exhibited by a crosslinked polymer gel relative to a non-gel fluid such as an uncrosslinked polymer solution having the same polymer concentration as the gel. Gel strength of a flowing gel is defined as the resistance of the gel to filtration or flow. Thermal stability is the ability of a gel to withstand temperature extremes without degradation.

Tailor-making or customizing a gel in the manner of the present invention to meet the performance requirements of a particular drilling operation is provided in part by correlating the independent gelation parameters with the dependent variable of gelation rate and resultant gel strength and stability. The independent gelation parameters are the surface and in situ gelation conditions including: temperature, pH, ionic strength and specific electrolytic makeup of the aqueous solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, filtration tests and core flooding experiments. The operable ranges of a number of gelation parameters and their correlation with the dependent variable are described below.

The lower temperature limit of the gel at the surface is its freezing point and the upper limit is essentially the thermal stability limit of the polymer. The gel is generally maintained at ambient temperature or higher at the surface. The temperature may be adjusted by heating or cooling the aqueous solvent. Increasing the temperature within the prescribed range increases the gelation rate.

The initial pH of the gel is within a range of about 3 to 13 and preferably about 6 to 13. Although gelation can occur at an acidic pH, lowering the initial pH below 7 does not favor gelation. The initial pH is most preferably alkaline, i.e., greater than 7 to about 13. When the polymer is PHPA, increasing the pH within the prescribed range increases the rate of gelation.

The polymer concentration in the gel is about 500 ppm up to the solubility limit of the polymer in the solvent or the rheological constraints of the polymer solution, preferably about 750 to about 200,000 ppm, and most preferably about 1000 to about 50,000 ppm. Increasing the polymer concentration increases the gelation rate and ultimate gel strength at a constant ratio of polymer to crosslinking agent.

The ionic strength of the aqueous solvent can be from that of deionized distilled water to that of a brine having an ion concentration approaching the solubility limit of the brine. Generally, fresh water has a total dissolved solids concentration below 500 ppm and a produced brine has total dissolved solids concentration above 500 ppm. Thus, fresh water and produced brines fall within the useful range of the present invention. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis for an acrylamide polymer is about 0 to 60% and preferably about 0 to 30%. Within the preferred range, increasing the degree of hydrolysis in most cases increases the gelation rate. Increasing the molecular weight of the polymer increases the gel strength.

It is apparent from these correlations that one can produce gels across a very broad range of gelation rates and gel properties as a function of the gelation conditions. Thus, to produce an optimum gel according to the present process, the practitioner predetermines the gelation rate and properties of the resultant gel which meet the performance requirements of a given situation and thereafter produces a gel having these predetermined characteristics. The performance requirements include in situ conditions such as temperature, drilling operating parameters, and formation geology. Analytical methods known to one skilled in the art are used to determine the performance requirements.

Generally, the gel is required to have sufficient strength to substantially eliminate or reduce lost circulation of a drilling fluid when an appropriate amount of the gel is placed in the wellbore. By "reducing lost circulation", it is meant that the degree of lost circulation experienced when using the gel is less than the degree of lost circulation experienced when a conventional drilling fluid is used in the absence of the gel. The gels of the present invention satisfying these criteria typically have a dynamic oscillatory viscosity at 0.1 radians per second between about $5 \times 10^2$ and about $10^9$ cp and preferably between about $5 \times 10^3$ and about $4 \times 10^7$ cp. The strength of the gel can be enhanced by the suspension of inert solids in the gel, including inert insoluble inorganic solids such as sand and fiberglass or inert insoluble organic solids such as cellulosic and plastic fibers.

The amount of gel employed in the present process is dependent on the geological properties of the formation as well as the drilling operating conditions. Where large voids are encountered during drilling which are in communication with the wellbore, large volumes of gel may be required to fill the voids and plug the wellbore face. In such cases, gel volumes on the order of 500 barrels or more can be necessary to practice the process of the present invention. However, if no large voids are encountered during drilling, one generally only requires a volume of gel approximately equal to the volume of the drilled out bore hole to practice the invention.

It is believed the gel functions as a lost circulation fluid by coating and plugging the wellbore face to prevent flow of fluids across the face. Substantially all of the permeability reduction caused by the gel in the formation occurs immediately adjacent the wellbore face, i.e., within about 1 centimeter of the wellbore face. The gel does not significantly penetrate the formation matrix beyond this distance. As a result, the gel is non-damaging to the formation in the sense that it does not substantially inhibit subsequent recovery of hydrocarbon fluids from the formation or injection of fluids into the formation.

As used herein, the term "wellbore face" is meant to include not only the face of the drilled out bore hole, but the face of any void spaces in direct communication with the drilled out bore hole, including the face of fractures, fracture networks, caverns, and other voids. These voids may extend far out into the formation away from the bore hole, but are distinguished from the formation matrix by having a permeability substantially equal to that of the bore hole while the permeability of the matrix is much lower than either.

The present invention can be practiced according to a number of different embodiments. In one embodiment of the invention, the gel is placed in the wellbore at the outset of a conventional drilling operation. The gel is circulated through the drilled out bore hole during the drilling operation to perform as both a drilling fluid and a lost circulation preventative.

In another embodiment, the gel is a lost circulation fluid additive to a conventional drilling fluid which is most typically a drilling mud. The term "drilling mud" as used herein is any drilling mud known in the art which does not contain the gel used in the present process. The gel is added to the drilling mud in a manner which uniformly mixes the two without substantially physically degrading the gel. The drilling operation is carried out with the drilling mud performing in a conventional manner while the gel acts as a preventative for lost circulation. In this case the gel may also beneficially enhance the rheological properties of the drilling mud.

In yet another embodiment of the present invention, the gel is employed in a remedial role. When lost circulation is detected during a drilling operation using a conventional drilling fluid, the gel is substituted for the entire volume of drilling fluid, either while continuing the drilling operation or suspending drilling in the wellbore. If drilling has not been suspended during placement of the gel in the wellbore, drilling is continued with the gel functioning as both a drilling fluid and a lost circulation fluid. If drilling has been suspended, drilling can be resumed after placement of the gel in the wellbore, while utilizing the gel as both a drilling fluid and a lost circulation fluid or by utilizing the gel as a lost circulation fluid and placing additional conventional drilling fluid in the wellbore to act as a drilling fluid.

In all of the embodiments of the present invention described above, the lost circulation fluid can be injected into the wellbore as a completely gelled composition or, alternatively, as a partially gelled composition. If the fluid is injected as a partial gel, complete gelation subsequently occurs in situ. Injection of partial gels offers the feature of increasing gel viscosity in situ over time which may be advantageous in some instances.

A "partial gel" as referred to herein is at least somewhat crosslinked, but is capable of further crosslinking to completion resulting in the desired gel without the addition of more crosslinking agent. Partial gels have a viscosity and/or plugging efficiency greater than an uncrosslinked polymer solution. "Complete gelation" means that the gel composition is incapable of further crosslinking because one or both of the required reactants in the initial solution are consumed. Further crosslinking is only possible if either polymer, crosslinking agent, or both are added to the gel composition.

In any case, all gels employed in the process of the present invention are reversible. Thus, if it is desired to enhance the removal of residual gel from the wellbore after the drilling operation, this can be accomplished by reversing the gel with a conventional breaker, such as peroxides, hypochlorites or persulfates. The breaker can be incorporated into the initial gel composition at the surface to break the gel over time or the breaker can be placed in the wellbore separately to and reverse the gel on contact at the desired time.

The following examples demonstrate the practice and utility of the present invention, but are not to be construed as limiting the scope thereof The following table is useful in interpreting the qualitative data set forth in the examples below.

GEL STRENGTH CODE

Code
A. No detectable gel formed: the gel appears to have the same viscosity as the original polymer solution and no gel is visually detectable.
B. Highly flowing gel: the gel appears to be only slightly more viscous than the initial polymer solution.
C. Flowing gel: most of the detectable gel flows to the bottle cap upon inversion.
D. Moderately flowing gel: only a small portion (about 5 to 15%) of the gel does not readily flow to the bottle cap upon inversion; this gel is characterized as a "tonguing" gel.
E. Barely flowing gel: the gel can barely flow to the bottle cap or a significant portion (>15%) of the gel does not flow upon inversion.

The polymer solutions of the following examples are prepared by diluting an aqueous acrylamide polymer solution with an aqueous solvent and combining the diluted polymer solution with a crosslinking agent solution in a 0.12 liter wide mouth bottle to form a 0.05 liter sample. The sample is gelled in the capped bottle and the qualitative gel strength is determined by periodically inverting the bottle.

Where quantitative viscosity data are obtained, the gel is placed in a variable pressure and temperature rheometer (viscometer), having an oscillatory mode of 0.1 rad/sec and 100% strain. The apparent viscosity at a shear rate of 0.1 sec$^{-1}$ is recorded as function of time.

In all of the examples, the acrylamide polymer is partially hydrolyzed polyacrylamide (PHPA), which is 30% hydrolyzed. The crosslinking agent solution is a complex or mixture of complexes comprising chromium III and acetate ions prepared by dissolving solid $CrAc_3 \cdot H_2O$ or $Cr_3Ac_7(OH)_2$ in water or diluting a solution obtained commercially under the label of "Chromic Acetate 50% Solution". The aqueous solvent is Denver, Colorado U.S.A. tap water unless stated otherwise.

EXAMPLE 1

The PHPA has a molecular weight of 11,000,000 and the aqueous solvent is an NaCl brine having a concentration of 5,000 ppm. The pH of the gelation solution is 8.6, the temperature is 22° C. and the ratio of PHPA to chromium III is 44:1. The data table below shows that the gel strength can be varied by varying the polymer concentration in the gelation solution while holding the ratio of polymer to crosslinking agent constant.

TABLE 1

| | Run No. | | | |
|---|---|---|---|---|
| | 1 | 2 | 3 | 4 |
| | ppm PHPA | | | |
| | 5,000 | 3,000 | 2,000 | 1,500 |
| | ppm $Cr^{III}$ | | | |
| | 114 | 68 | 45 | 34 |
| Time (hr) | Gel Code | | | |
| 1.0 | A | A | A | A |
| 2.0 | B | A | A | A |
| 3.0 | B | A | A | A |
| 4.0 | B | A | A | A |
| 5.0 | C | B | A | A |
| 6.0 | C | B | A | A |
| 24 | C | B | B | A |
| 48 | C | B | B | A |
| 72 | C | B | B | A |
| 96 | D | B | B | A |
| 168 | E | B | B | A |
| 300 | E | B | B | A |
| 600 | E | B | B | A |
| 1200 | E | C | B | A |
| 2400 | E | C | B | A |

EXAMPLE 2

The PHPA has a molecular weight of 5,000,000 and has a concentration of 8400 ppm in the gelation solution. The aqueous solvent is an NaCl brine having a concentration of 5000 ppm. The pH of the gelation solution is 12.5, the temperature is 22° C., and the ratio of PHPA to chromium III is 40:1. The data table below shows that a utilitarian gel can be produced even at a relatively high pH.

TABLE 2

| Time (hr) | Gel Code |
|---|---|
| 0.5 | A |
| 1.0 | A |
| 1.5 | A |
| 2.0 | A |
| 2.5 | B |
| 4.0 | B |
| 5.0 | B |
| 6.0 | B |
| 7.0 | B |
| 8.0 | B |
| 24 | B |
| 28 | C |
| 48 | C |
| 80 | C |
| 168 | C |
| 600 | D |
| 2040 | D |

EXAMPLE 3

A series of gels are prepared under the same conditions as Example 2, but at a neutral pH of 7. Common oil field salts are added to the gelation solutions during formulation. The data table below shows that gels can be formed which are relatively insensitive to a number of common oil field salts.

TABLE 3

| | Run No. | | |
|---|---|---|---|
| | 1 | 2 | 3 |
| | Salt | | |
| | none (control) | $NaNO_3$ | $MgCl_2$ |
| | ppm Salt | | |
| | — | 2000 | 2000 |
| Time (hr) | Gel Code | | |
| 1.0 | A | A | A |
| 4.0 | A | A | A |
| 5.0 | B | B | B |
| 6.0 | B | B | B |
| 7.0 | B | B | B |
| 8.0 | C | C | C |
| 24 | C | C | C |
| 72 | D | D | D |
| 120 | E | E | E |
| 264 | E | E | E |
| 288 | E | E | E |
| 408 | E | E | E |

EXAMPLE 4

The PHPA has a molecular weight of 11,000,000. The ratio of polymer to crosslinking agent is 66:1. The aqueous solvent is a synthetic oil field brine at a pH of 7.5 and a temperature of 22° C. The composition of the synthetic brine is set forth below. The data table below shows that utilitarian gels can be formed in oil field brines.

TABLE 4

| | Run No. | |
|---|---|---|
| | 1 | 2 |
| | ppm PHPA | |
| | 3,000 | 5,000 |
| | ppm $Cr^{III}$ | |
| | 45 | 76 |
| Time (hr) | Gel Code | |
| 0.25 | A | A |
| 0.5 | A | A |
| 4.0 | A | A |
| 5.0 | A | A |
| 6.0 | A | B |
| 7.0 | A | C |
| 24 | B | D |
| 96 | C | D |
| 150 | D | D |
| 197 | D | D |
| 936 | D | D |

| Synthetic Brine Composition | |
|---|---|
| | g/l |
| $Na_2CO_3$ | 0.249 |
| $NH_4Cl$ | 0.086 |
| $CaCl_2$ | 0.821 |
| $MgCl_2.6H_2O$ | 1.78 |
| $Na_2SO_4$ | 1.09 |
| NaCl | 6.89 |

EXAMPLE 5

The PHPA has a molecular weight of 5,000,000 and the aqueous solvent is an oil field brine having an $H_2S$ concentration greater than 100 ppm and a total dissolved solids concentration of 0.33% by weight. The composition of the solvent is shown below. The pH of the gelation solution is 8.5 and the temperature is 60° C. The data table below shows that utilitarian gels can be formed in the presence of $H_2S$ and at an elevated temperature.

TABLE 5

| | Run No. | |
|---|---|---|
| 1 | 2 | 3 |
| | ppm PHPA | |
| 3000 | 4000 | 5000 |
| | ppm $Cr^{III}$ | |
| 55 | 73 | 65 |
| | Weight Ratio/PHPA:Cr | |
| 55 | 55 | 77 |

| Time (hr) | Gel Code | | |
|---|---|---|---|
| | 1 | 2 | 3 |
| 0.5 | A | A | A |
| 1.0 | A | A | A |
| 1.5 | A | B | C |
| 2.0 | B | C | D |
| 3.0 | C | D | D |
| 4.0 | D | D | D |
| 5.0 | D | D | E |
| 7.0 | D | E | E |
| 12 | D | E | E |
| 27 | D | E | E |
| 75 | D | E | E |
| 173 | D | E | E |
| 269 | D | E | E |
| 605 | D | E | E |

| Synthetic Brine Composition | |
|---|---|
| | ppm |
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

EXAMPLE 6

The PHPA has a molecular weight of 5,000,000 and the aqueous solvent is an NaCl brine having a concentration of 3,000 ppm. The concentration of PHPA in the gelation solution is 5,000 ppm and the ratio of PHPA to chromium III is 32:1. The pH of the solution is 10.2 and the temperature is 22° C.

Three experiments are conducted to determine the effects of shear on the gel. The gel of Run 1 is aged without agitation. The gel of Run 2 is stirred for five minutes at 1750 rpm with a 4cm propeller in a 6cm ID capped bottle after one hour of aging. The gel of Run 3 is forced through a 10cm long nylon tube with a 0.16 cm ID at a rate of 100 cm³ in 7.2 sec. and at a pressure drop of 410 kPa (a shear rate of about 50,000 sec$^{-1}$) after one hour of aging. The data table below shows that the gels maintain their integrity even after undergoing shear during gelation.

TABLE 6

| | Run No. | | |
|---|---|---|---|
| | 1 | 2 | 3 |
| Time (hr) | Gel Code | | |
| 1.0 | A | A | A |
| 1.5 | B | B | B |
| 4.0 | D | D | D |
| 17 | E | E | E |
| 24 | E | E | E |
| 96 | E | E | E |
| Apparent Viscosity at 50 sec$^{-1}$ | | | |
| 96 | 1400 | 2000 | 2300 |

EXAMPLE 7

Two gel samples are prepared from PHPA having a molecular weight of 5,000,000 in the aqueous solvent of Example 5. The gel of the first sample is crosslinked with a chromium VI redox crosslinking system. The ratio of PHPA to crosslinker is optimized for each gel system.

The thixotropic loops are steady shear experiments performed at 22° C. on a Rheometric Pressure Rheometer. The data table below shows that the gel of the present invention has a much greater ability to withstand shear than a comparable gel prepared with a different crosslinking agent system.

TABLE 7

| | Run No. | |
|---|---|---|
| | 1 | 2 |
| | Crosslinker | |
| | $Cr^{III}$ | $Cr^{VI}$ Redox |
| | ppm PHPA | |
| | 2500 | 3000 |
| | PHPA:Crosslinker | |
| | 12.5 | 30 |
| Shear Rate (sec$^{-1}$) | Viscosity (cp) | |
| 5 | 5300 | 1800 |
| 10 | 3800 | 1400 |
| 20 | 1900 | 800 |
| 40 | 1200 | 500 |
| 60 | 900 | 400 |
| 80 | 800 | 300 |
| 100 | 600 | 200 |
| 80 | 800 | 200 |
| 60 | 900 | 200 |
| 40 | 1000 | 200 |
| 20 | 1400 | 200 |
| 10 | 2000 | 200 |
| 5 | 3100 | 200 |

EXAMPLE 8

The PHPA has a molecular weight of 5,000,000 and the aqueous solvent is an NaCl brine having a concentration of 3,000 ppm. The concentration of PHPA in the gelation solution is 5,000 ppm, the pH of the gelation solution is 10.2, the temperature is 105° F. and the ratio of PHPA to chromium III is 32:1. The gelation solution is aged for one hour after mixing at which time no gel is visually detected by bottle testing. 50 cm³ of gel sample is placed in a Millipore filter holder. A pressure of 50 psi is applied to the gel in an effort to drive the gel through an 8 micron cellulose-acetate Millipore filter having a 47 mm diameter. Only 0.8 cm³ of gelation solution passes through the filter after 10 minutes of applied pressure. An entire 50 cm³ of polymer solution without crosslinking agent passes through the filter in 2.6 minutes under identical experimental conditions.

The results show that the gelation solution is sufficiently crosslinked after only one hour of aging to render it essentially unfilterable. Likewise a gelation solution that cannot pass through an 8 micron filter would not be expected to significantly permeate competent formation matrix rock having a permeability less than 1000 md. Nevertheless, bottle testing indicates that the gelation solution remains highly fluid for use as a drilling fluid.

EXAMPLE 9

A mature gel is prepared by crosslinking PHPA with a chromic acetate complex. The PHPA has a molecular weight of 11,000,000 and is diluted to a concentration of 5000 ppm in a synthetic injection water. About 0.5 l of the gel is injected for 14 hours across the face of a 35 md Midcontinent Field carbonate core plug while a 42 psi differential pressure is applied to the length of the plug. The core plug is 2.7 cm long and has a diameter of 2.5 cm. A clear filtrate having essentially the viscosity of water is produced from the core plug.

After gel injection, the core plug is flooded for two days with about 8 pore volumes of brine until the permeability of the core plug stabilizes at 4.1 microdarcies ($k_{final}/k_{initial} = 0.00012$). Thereafter, the first 4 mm of core material from the injection face are cut away from the core. The permeability of the remaining plug slightly exceeds the initial permeability of the plug (35 md).

The results indicate that permeability reduction is confined to the core material in the first 4 mm from the injection face. Thus, the gel does not substantially invade formation rock and does not cause permeability reduction in the matrix a significant distance from the wellbore face.

While the foregoing preferred embodiments of the invention have been described and shown, it is understood that the alternatives and modifications, such as those suggested and others, may be made thereto and fall within the scope of the invention.

I claim:

1. A process for preventing significant lost circulation while drilling a wellbore in a hydrocarbon-bearing formation having a formation matrix below an earthen surface, the process comprising:
    admixing components of a continuous flowing gel at the surface comprising a water-soluble carboxylate-containing polymer, a complex capable of crosslinking said polymer and formed of at least one electropositive chromium III species and at least one electronegative carboxylate species, and an aqueous solvent for said polymer and said complex; and
    circulating said gel through said wellbore while said wellbore is being drilled to prevent significant lost circulation.

2. The process of claim 1 wherein said complex is additionally formed of at least one species selected from the group consisting of electronegative oxygen species, electronegative hydroxide species, inorganic monovalent ions, inorganic divalent ions, water molecules and mixtures thereof.

3. The process of claim 1 wherein said gel is circulated through said wellbore in a mixture with a drilling mud.

4. The process of claim 1 wherein said aqueous solvent is a produced brine.

5. The process of claim 1 wherein said carboxylate-containing polymer is an acrylamide polymer.

6. The process of claim 1 wherein said carboxylate-containing polymer is selected from the group consisting of polyacrylamide and partially hydrolyzed polyacrylamide.

7. The process of claim 1 wherein said gel does not substantially penetrate said formation matrix.

8. A process for preventing significant lost circulation while drilling a wellbore in a hydrocarbon-bearing formation having a formation matrix below an earthen surface, the process consisting essentially of:
    admixing component of a continuous flowing gel at the surface comprising a water-soluble acrylamide polymer, a chromic-carboxylate complex crosslinking agent capable of crosslinking said acrylamide polymer, and an aqueous solvent; and
    circulating said gel through said wellbore while said wellbore is being drilled without significant lost circulation of said gel from said wellbore.

9. A process for substantially reducing lost circulation of a drilling mud when drilling a wellbore in a formation having a formation matrix below an earthen surface, the process comprising:
    monitoring the circulation of said drilling mud while drilling said wellbore in said formation,
    placing a continuous flowing gel having an initial pH of about to about 13 and comprising a water soluble carboxylate-containing polymer, a complex capable of crosslinking said polymer and formed of at least one electropositive chromium III species and at least one electronegative carboxylate species, and an aqueous solvent for said polymer and said complex, all mixed at the surface, in said wellbore when lost circulation of said drilling mud is detected, wherein placement of said gel substantially reduces lost circulation of said drilling mud.

10. The process of claim 9 further comprising interrupting drilling of said wellbore when lost circulation is detected and prior to placement of said gel in said wellbore.

11. The process of claim 10 further comprising resuming drilling of said wellbore after placement of said gel in said wellbore.

12. The process of claim 10 further comprising:
    injecting said drilling mud into said wellbore after placement of said gel in said wellbore; and
    resuming drilling of said wellbore.

13. The process of claim 10 wherein said gel has an initial pH of about 6 to about 13.

14. The process of claim 13 wherein said gel has an initial pH greater than 7 to about 13.

15. The process of claim 9 wherein said complex is additionally formed of at least one species selected from the group consisting of electronegative oxygen species, electronegative hydroxide species, inorganic monovalent ions, inorganic divalent ions, water molecules and mixtures thereof.

16. The process of claim 9 wherein said aqueous solvent is a produced brine.

17. The process of claim 9 wherein said carboxylate-containing polymer is an acrylamide polymer.

18. The process of claim 9 wherein said carboxylate-containing polymer is selected from the group consisting of polyacrylamide and partially hydrolyzed polyacrylamide.

* * * * *

UNITED STATES PATENT AND TRADEMARK OFFICE
CERTIFICATE OF CORRECTION

PATENT NO. : 4,989,673

DATED : February 5, 1991

INVENTOR(S) : Robert D. Sydansk

It is certified that error appears in the above-identified patent and that said Letters Patent is hereby corrected as shown below:

Col. 13, line 49: After "claim", insert --1--.
Col. 14, line 18: After the first occurrence of "about", insert --3--.

Signed and Sealed this

Seventh Day of July, 1992

Attest:

DOUGLAS B. COMER

*Attesting Officer*   Acting Commissioner of Patents and Trademarks